United States Patent Office 2,880,831
Patented Apr. 7, 1959

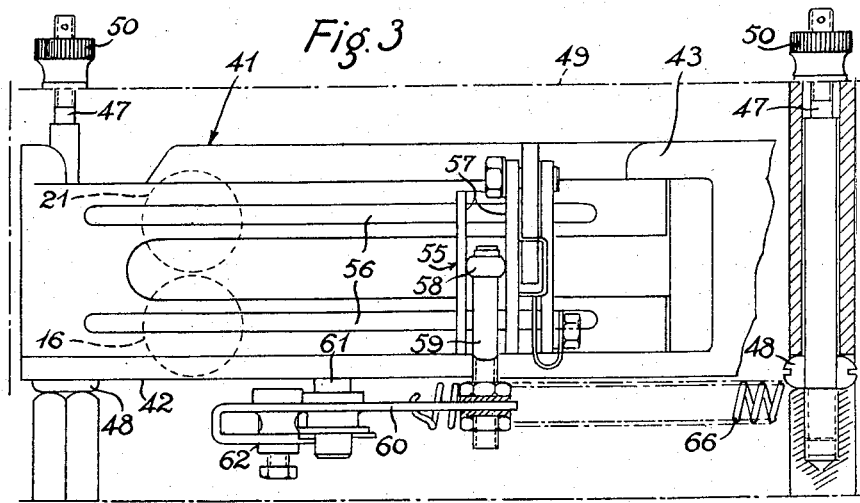
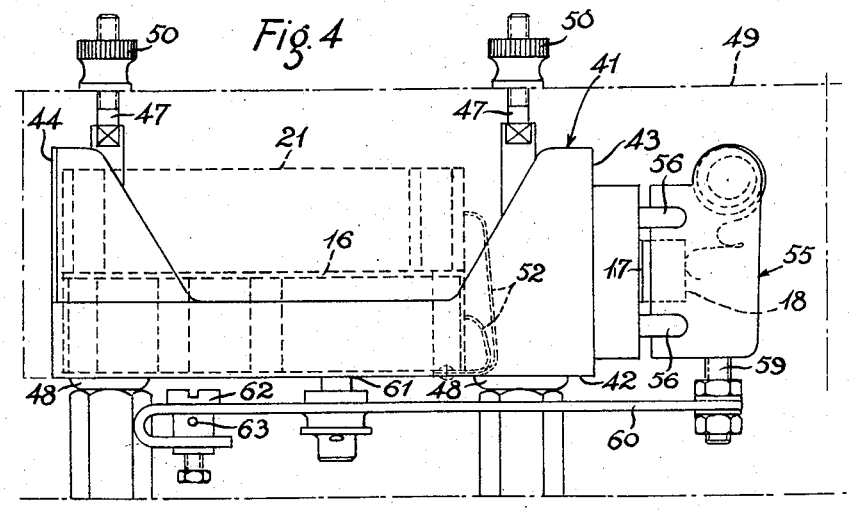

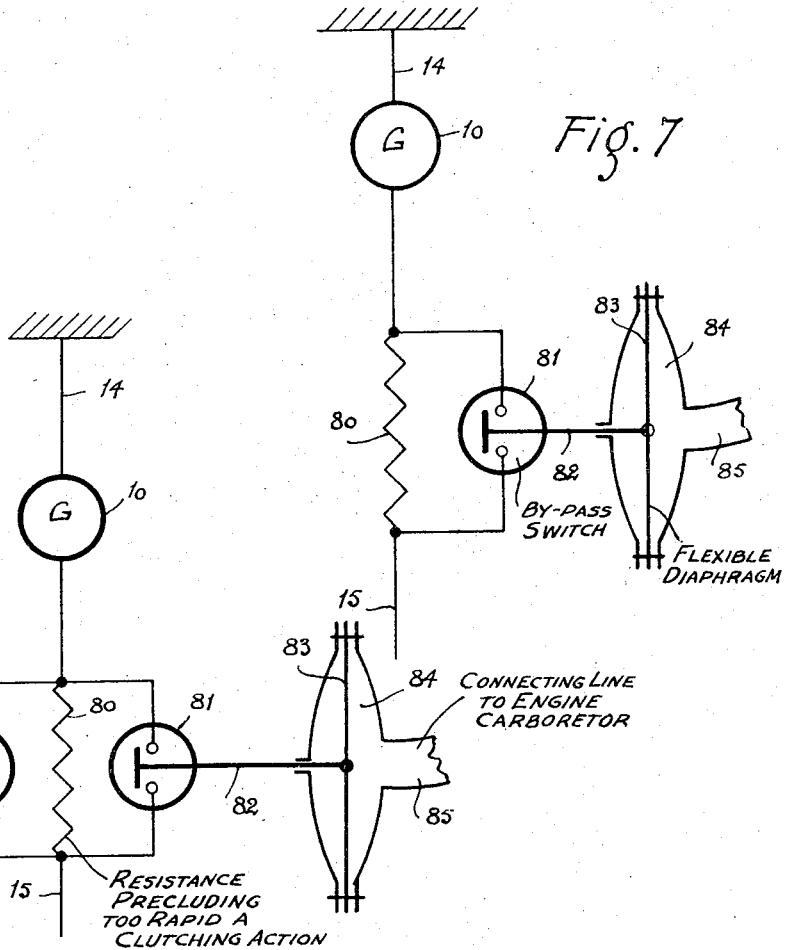

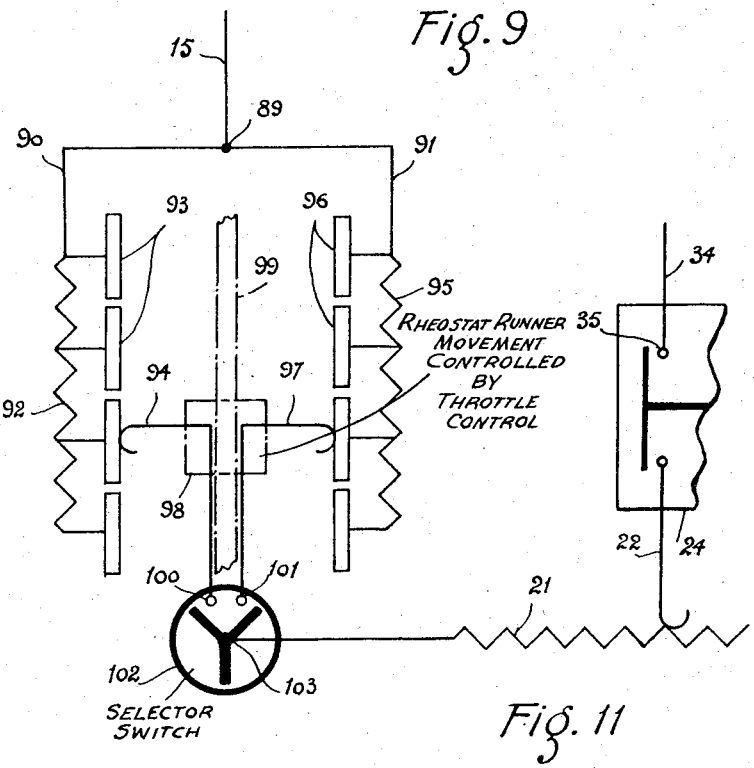
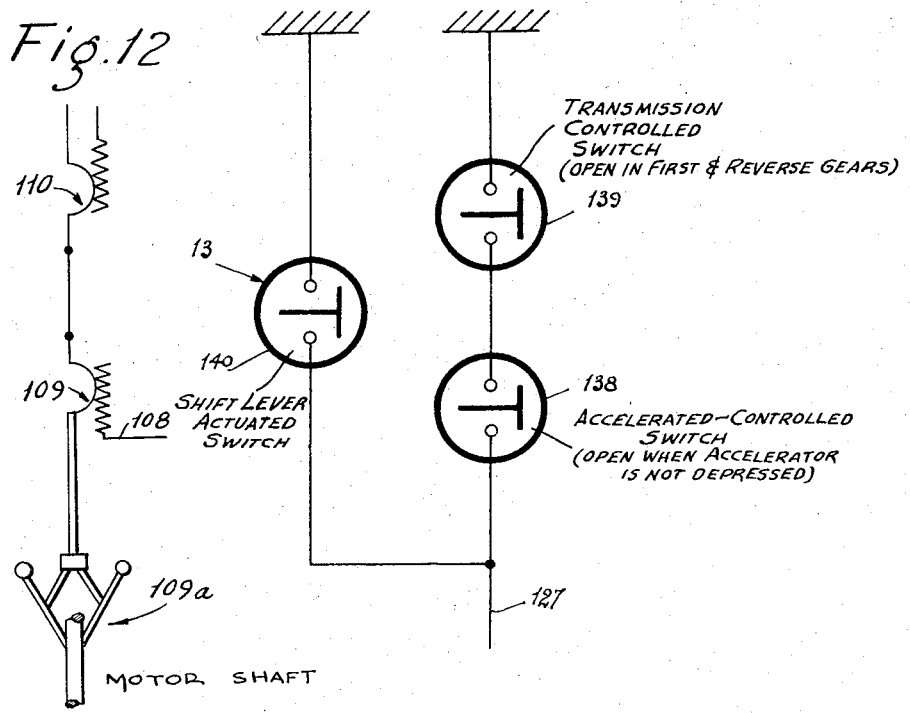

2,880,831

CIRCUITS FOR THE CONTROL OF AN ELECTROMAGNETIC CLUTCH

Jean Maurice, Ablon, and Michel Rist, Paris, France assignors to Societe Anonyme Francaise du Ferodo, Paris, France Application July 21, 1953, Serial No. 369,501

Claims priority, application France July 23, 1952

17 Claims. (Cl. 192—.052)

The present invention refers to a circuit for the control of an electromagnetic clutch intended particularly for motor-vehicles, comprising an acceleration control and a device such as a lever actuating a gear-box, of the type in which the engagement or the disengagement are obtained according to whether or not the winding of the electromagnet is energized by at least one source of current, the tightening effort of the frictional members of the clutch being the weaker as the current sent into the said winding is itself weaker, while means are provided for cutting or practically annulling the supply current of the said winding when the said speed lever is actuated.

Usually electromagnetic clutches of this kind are automatic but require particular precautions on the part of the driver in order to avoid the jamming of the motor and failures in the transmission, especially while driving in town and while maneouvering.

An essential object of the invention is to provide a circuit for the control of an electromagnetic clutch in accordance with which the operation is not only automatic but also smooth and efficacious under all circumstances no matter how skilled the driver may be.

The circuit according to the invention is particularly characterised by a resistance introduced in the supply circuit of the clutch winding the value of which is made to vary as a function of the position of the accelerator, so that when the accelerator is not actuated or is pushed slightly, the said resistance is high so as to render the clutching gradual, while from a suitable point of the stroke of the accelerator, the resistance is negligible in order to obtain a total clutching. Due to this arrangement, each time that a maneouver is performed during which the accelerator is substantially released, the clutch remains free, at any rate to a certain extent and only becomes total again when the maneouver is carried out. So, when starting, and after passing through the speeds, the driving shaft and the driven shaft of the clutch may easily adapt themselves to each other until they revolve substantially in synchronism. Any risk or jamming of the motor, particularly when starting, and of failures after the passages through the speeds, especially in the reverse speeds, are in this manner avoided.

According to another feature, means are provided in the circuit for substantially annulling sensibly the current supplying the winding of the electromagnet and substantially disengaging the clutch during time the gear-box is in the first speed or reverse and the accelerator is in an inoperative position corresponding to the slow running of the motor. In this way one proceeds automatically with free wheeling when one happens to be in first or in reverse and the motor is running slowly. Owing to this fact driving in town or during maneouvering is rendered smoother and pleasanter without risks of sudden brakings.

According to another feature, the circuit supplying the clutch winding is supplied either by the dynamo coupled to the motor, or by the battery, at least one reverser being provided for passing from the supply by the dynamo to the supply by the battery and reciprocally. In one embodiment, the reverser is subjected to the speed of the driven shaft of the clutch so that the supply by the dynamo, or on the contrary the supply by the battery, is obtained according to whether or not the speed is lower or higher than a predetermined value. Owing to this arrangement the motor brake is obtained independently of the speed of the motor when the vehicle drives the driven shaft at a sufficient speed, which permits the motor to be launched by the vehicle, to linger without any drawback in the passage of the speeds, to do away with any jamming of the motor of some duration etc. When shaft is driven at a speed higher than that referred to above, it is the dynamo which supplies the winding. When stopped or when running slowed, there is therefore an automatic disengagement. When starting, the progressive engagement is enhanced in this manner.

Other objects, characteristic features and advantages of the invention will become evident by reference to the following description of embodiments chosen by way of example, with reference to the accompanying drawings, in which:

Fig. 3 is a view of the box along the arrows III—III of Fig. 2.

Fig. 4 is a view of the box according to the arrows IV—IV of Fig. 2.

Fig. 5 is a partial view from above of the rheostat of the chest.

Fig. 6 is a corresponding elevation of this rheostat.

Fig. 7 is a partial view of the circuit of Fig. 1 to which is added a security device for avoiding any risk in the working in case of too sudden an operation of the accelerator.

Fig. 8 is a view similar to Fig. 7 but concerning an alternative security device.

Fig. 9 is a partial view of the circuit of Fig. 1, in which the resistance connected to the accelerator and to the speed lever is modified.

Fig. 11 is a view of a modified portion of the circuit of Fig. 10.

Fig. 12 is a view of a further modified portion of the circuit 10.

Figure 1:
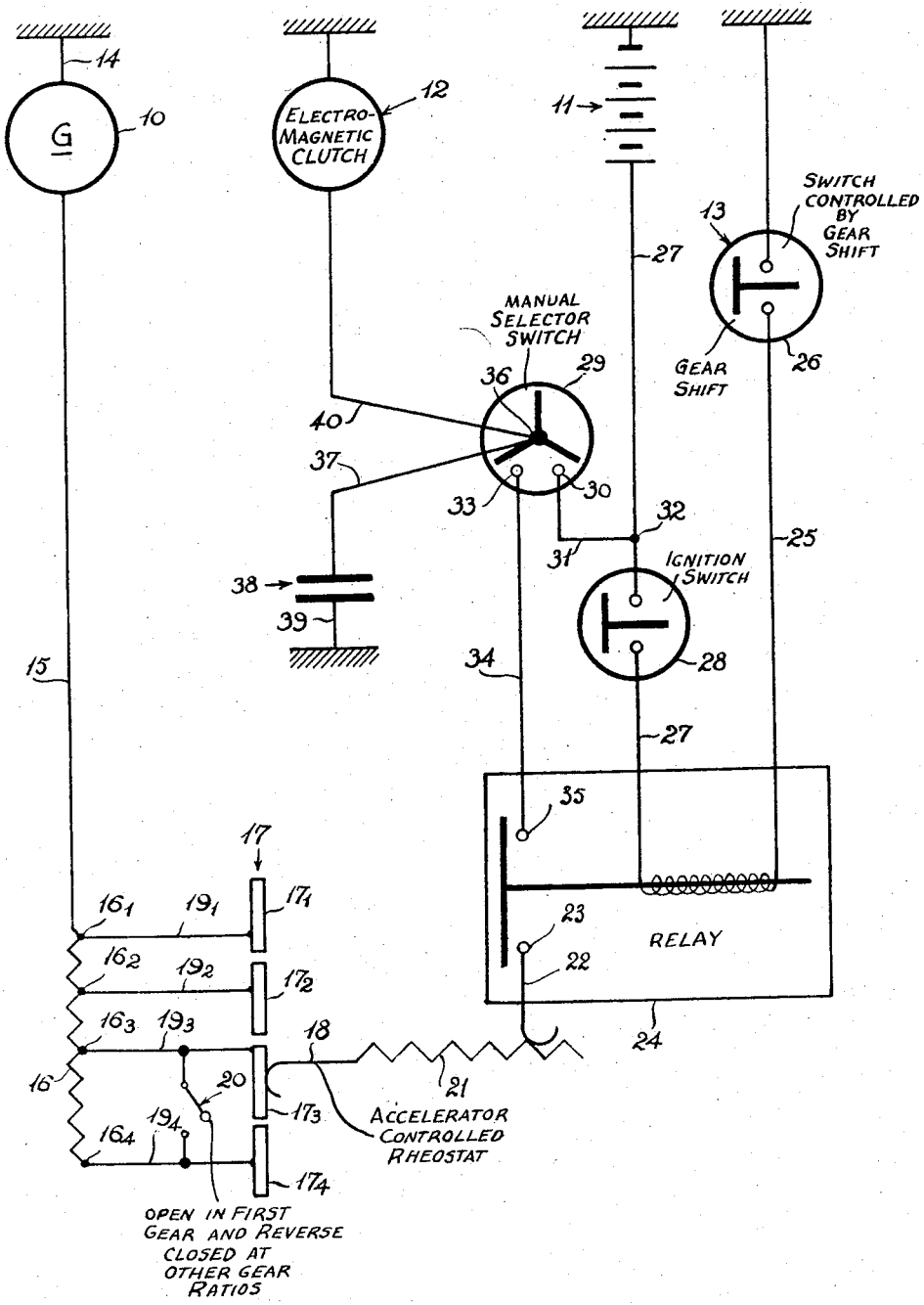
Fig. 1 is a diagram of the whole of a controlling circuit according to the invention.

In the embodiment represented in Figs. 1 to 6, which covers by way of example an application of the invention to a motor vehicle provided with an internal combustion engine, it will be seen by reference to Fig. 1, the dynamo driven by the crankshaft of the motor is shown diagrammatically at 10 and the battery of accumulators are shown at 11. The dynamo or generator 10 and the battery 11 are of the type usually part of the equipment of a normal vehicle and ensure all their usual functioning, with the usual couplings, particularly with circuit-breaker and/or voltage regulator. The electromagnetic clutch is shown at 12, engaged when its winding receives a sufficient current and disengaged when its winding does not receive current, the effort tightening the frictional members of the clutch being the weaker so that the current supplied to the said winding is itself weaker. 13 designates a speed lever of the bent type, actuating the gear-box. These different elements constitute parts of an adjustable controlling electric circuit arranged according to the invention to ensure an easy drive of the vehicle and with a particularly simple construction.

One of the terminals of the dynamo 10 is grounded by a conductor 14, while the other terminal is connected by a conductor 15 to the resistance 16 of a rheostat of which the fixed studs are seen at 17 and the movable contact is seen at 18.

In the example shown, four studs $17_1$, $17_2$, $17_3$, $17_4$ are provided and are connected by conductors $19_1$, $19_2$, $19_3$, $19_4$ to four points $16_1$, $16_2$, $16_3$, $16_4$ stepped along the resistance 16, so that the contact on the stud $17_1$ introduces in the circuit a zero resistance, and, on the studs $17_2$, $17_3$, $17_4$, respectively resistances which are higher and higher. Preferably, the elementary resistances corresponding to the successive sections $16_4$—$16_3$, $16_3$—$16_2$, $16_2$—$16_1$, are respectively decreasing, at least for the first sections. A circuit-breaker is disposed between the conductors $19_3$ and $19_4$ in order to allow the studs $17_3$ and $17_4$ to be shunted when desired, as shown at 20.

The movable contact 18, which is controlled by the accelerator as will be seen later, is connected to a resistance 21. The latter is intended to be adjusted in order to ensure a suitable attractive force between the electromagnetic elements of the clutch, taking into account the state of wear of the frictional packings. The resistance 21 is combined with a movable finger 22 connected to a terminal 23 of a relay 24. The winding of the relay 24 has one end connected to ground by a conductor 25 comprising a cut-out 26 controlled by the speed bent-lever 13. The other end of the winding is connected to a conductor 27 comprising a general ignition switch 28 and connected to a terminal of the battery 11 the other terminal of which is connected to ground. It will be seen that the current supplied to the cut-out 26 of the lever 13 and also to the contact 28 may be rendered as weak as one desires by suitably selecting the winding of the relay, which enhances the permanency of the contacts. Preferably, the relay 24 is an open relay, that is to say it opens the contact 23—35 when it is energized and leaves it closed when it is not energized.

A reverser 29 has a terminal 30 connected by a conductor 31 to a point 32 of the conductor 27 comprised between the battery 11 and the contact 28, while the other terminal 33 of the reverser 29 is connected by a conductor 34 to the second terminal 35 of the relay 24.

The double movable finger 36 of the reverser 29 is connected on the one hand, by a conductor 37 to a condenser 38 grounded at 39, on the other hand, by a conductor 40 to one end of the winding of the clutch 12 the other end of which is grounded.

In normal working, the cut-out 26 is open, while the contact 28 is closed. The winding of the relay 23 supplied by the battery 11 is de-energized, for connecting the terminals 23 and 35 of this relay. The finger 36 of the reverser 29 being connected to the terminal 33, the winding of the clutch 12 is supplied with current by the dynamo 10. The clutch will be engaged as soon as the dynamo will generate enough current.

When the speed bent-lever or gear shift lever 13 is operated, the cut-out 26 closes, the winding of the relay 24 is energized, the terminals 23 and 35 are disconnected one from the other, and the winding of the clutch 12 is no longer supplied wiht current. Whereby clutch becomes disengaged.

It will be noticed that with the supply by the dynamo, there is disengagement automatically at slow speed, for the dynamo gives very little current at that time. Owing to this, a gradual engagement is obtained when starting and this gradual action is enhanced by the rheostat 17—18 the movable contact 18 of which is, as it has been seen controlled by the accelerator so that the resistance introduced in the circuit should be high when the throttle is closed and decreasing at the same time as the throttle is more or less open. For each movement of displacement of the butterfly-valve controlling the gaseous fuel, there is preferably a greater displacement of the movable contact 18 when the butterfly-valve is almost closed than for the other positions of this butterfly-valve, so that the gradual action of the engagement is further enhanced when starting from the stopped position. This may be obtained by means of any suitable mechanism, for example by levers, cams and other transmissions.

It will thus been seen that when the throttle is closed, or almost closed, the resistance introduced in the circuit is very high, rendering the engagement of the clutch very gradual. For the purpose of restoring to the clutch all its efficiency, as soon as the gradual action is no longer necessary, means are provided according to the invention for rapidly decreasing the value of the resistance when the throttle begins to open. To this end, the resistance is practically cut out when the admission reaches approximately one-third of the total admission. Furthermore, the fact mentioned above that the first section $16_4$—$16_3$ (Fig. 1) is more resistant than the second section $16_3$—$16_2$, enhances the speed with which the resistance causing a gradual action is diminished. So, it is seen that the resistance decreases faster at the beginning than at the end of said cutting-out of the resistance. In order to be precise and by way of non-limiting example, in a vehicle of 45 B.H.P. in which the butterfly valve performs an angular run of about 85° between the closure and the total admission, the resistance will be of 20 ohms for the closure, 10 ohms for 10° of run, 5 ohms for 15° of run and zero for 30° of run.

In order to avoid the introduction of a too large resistance in the circuit while running in second speed, third speed or eventually higher, while the action on the accelerator is slight, the circuit-breaker 20 is connected to the gear-box so that this circuit-breaker is open in first speed or reverse and closed for the other speeds. For these other speeds, the resistance introduced in the circuit will be in this manner limited to a value sufficient for the motor to pick-up correctly.

The total resistance $16_1$—$16_4$ is chosen so that when it is introduced in the circuit, the couple which can be transmitted by the clutch will be small and will not exceed about one-half of the braking couple of the motor, that is to say does not exceed one-quarter of the maximum couple of the motor.

So, in the conditions in which this total resistance $16_1$—$16_4$ is introduced in the circuit, that is to say in first speed or reverse, with the accelerator inoperative, a portion of the couple or torque of the motor may be used for slowing-down the vehicle but without risk of causing a brutal braking jerk.

The partial resistance $16_1$—$16_3$ is selected so that when it is introduced in the circuit, the torque which may be transmitted by the clutch is slightly greater than the normal braking couple or braking torque of the motor, that is to say is slightly greater than one-half of the maximum couple of the motor, but is less than the couple which corresponds to the slipping of the driving wheels on the ground with a vehicle which is not loaded and bad adhesion.

Therefore under conditions in which this partial resistance $16_1$—$16_3$ is introduced in the circuit, that is to say in the second or third speed, or higher, with the accelerator inoperative, the braking couple of the motor is fully utilized as in an ordinary clutch, but with this difference that the clutch plays the part of a limiter of couple, as soon as the braking by the motor would introduce the risk of causing the slipping of the vehicle.

It happens that these values of the resistances $16_1$—$16_4$ and $16_1$—$16_3$ are perfectly compatible with the conditions mentioned above of gradual action when starting and of efficacy in normal running and it will be appreciated that the arrangement according to the invention permits obtaining of a smooth, efficacious and, certain operation by means of a particularly simple construction.

In case of failure of the dynamo, or if it is desired to start the motor by driving it by the vehicle, it suffices to place the finger 36 of the reverser or selector switch 29 on the terminal 30, which ensures the supply of the winding of the clutch by the battery 11. One can also, by such a supply, maintain the vehicle clutched when stopped, for example in the case of failure of the handbrake on a hill.

It will be noted that the condenser 38 prevents any degradations or arcing with consequent pitting at the various contacts.

While the reverser 29 and the general contact 28 are disposed on the dashboard of the vehicle, the resistances 16 and 21, the relay 24 and the condenser 38 are grouped and enclosed in a small chest or box.

This box is seen at 41 in Figs. 2 to 6 to which reference will now be made.

The chest 41 is in the form of a box having a bottom 42 and four vertical walls, a front wall 43, a back wall 44, two lateral walls 45, 46, and is mounted on small columns 47 with india-rubber chocks 48 to absorb the vibrations, while a lid 49, surrounding the chest 41 for clearance, is fixed to the small columns 47 by nuts 50. Lead seals (not shown) may be applied to the nuts 50 to prevent any access to the chest by an incompetent user.

The conductors 25, 27, 34, 37 and 15 enter into the chest or box and are held by a connection-box 51 inside the chest 41, fixed to the back wall 44 of the latter.

The resistances 16 and 21 are superposed in the chest in the neighbourhood of the lateral wall 45 and are held by flexible supports 52, while the fixed studs of the rheostat 17 are disposed against the front wall 43, outside the chest 41 and inside the lid 49. The resistance 21 for the compensation of the wear of the fittings is disposed above the resistance 21 so as to be more easily accessible.

The rheostat 17 (Figs. 5 and 6) is constituted by an insulating plate 53 of hair-pin shape in which are inserted the copper studs $17_1$, $17_2$, $17_3$, $17_4$ insulated by mica washers 54.

A cursor 55 is mounted slidably on rods 56 fixed to the plate 53 and carries the movable contact 18 constituted by a piece of carbon applied by a spring against the stud 17. The cursor is movable between two positions in which the carbon 18 is applied against the stud $17_1$ and the stud $17_4$, respectively. It is by one of the rods 56 that the connection to the resistance 21 is carried out.

The cursor 55 carries a guide 57 in which is mounted an insulating small wheel 58 disposed at the end of a pin 59. The latter is fixed at the end of a lever 60, extending under the chest 41 and pivoted at 61 at an intermediate portion under the bottom 42. The other end 62 of the lever 60 receives a flexible cable 63 connected to the carburetter of the vehicle. The sheath 64 of the cable is fixed to the lateral wall 46 of the chest by a nut 65 for the adjustment of the cable. A spring 66 ensures the return of the lever in its position in which the carbon 18 is opposite the stud $17_4$.

The circuit-breaker 20 is disposed in the chest and is fixed against the wall 46, and the push button of this circuit-breaker, 67, is combined with a lever 68, pivoted at 69 on the casing of the circuit-breaker. The lever 68 is connected to a flexible cable 70 extending up to the gear-box, so that the circuit-breaker 20 is open in first speed and in reverse and is closed for the other speeds. The sheath 71 of the cable 70 is fixed to the wall 46 by a nut 72 for the adjustment of the cable.

The relay 24 and the condenser 38 occupy a central position in the chest and are fixed on the bottom 42, the relay 24 being on the side of the wall 46, while the condenser 38 is on the side of the wall 45.

Figure 2:
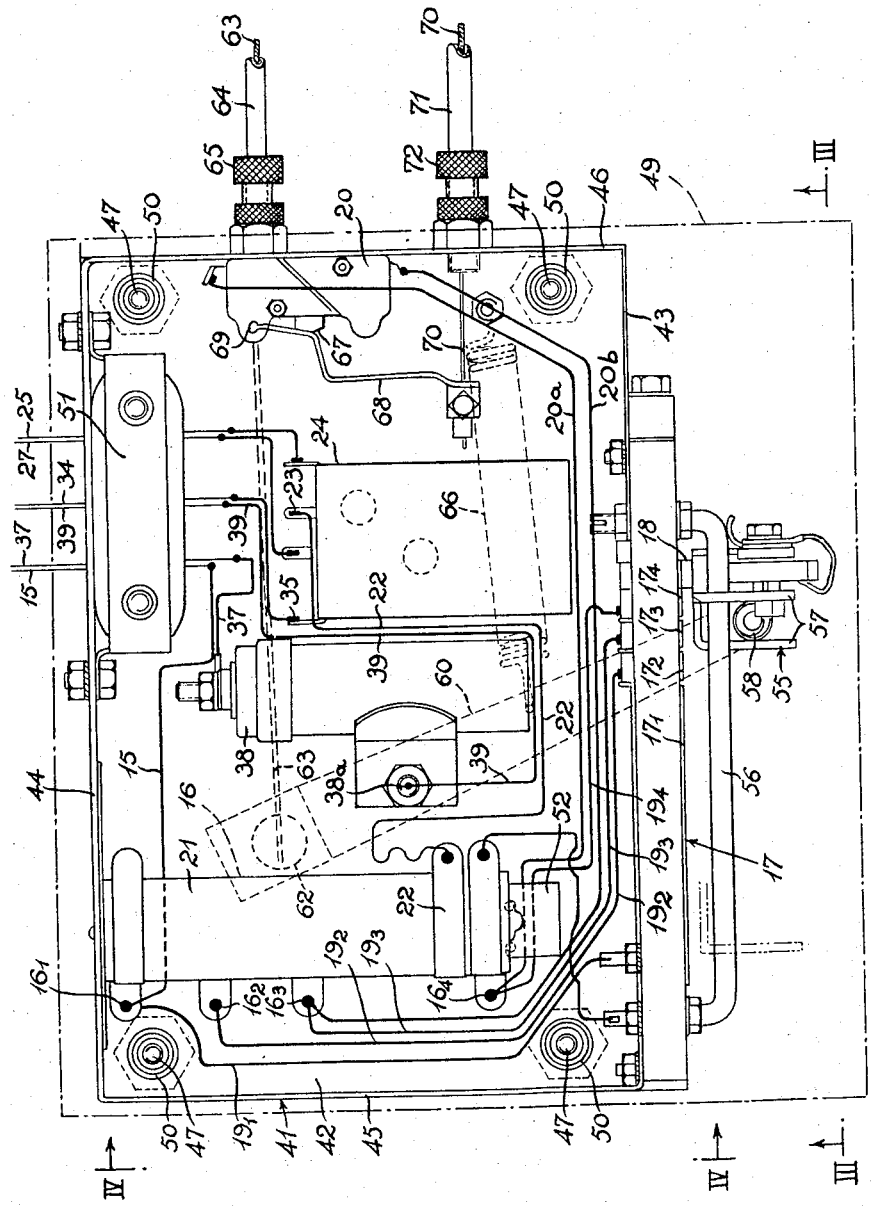
Fig. 2 is a plan view of a connection box according to the invention.

The simplicity of the cable arrangement provided in the chest and adapted to the lay-out which has just been described and shown in Fig. 2 will be appreciated.

At their exit from the casing 51 inside the chest, the conductors 15 and 37 are close to each other, like the conductors 39 and 34 and the conductors 27 and 25. The conductors 15, 37 are disposed on the side of the wall 45, the conductors 39, 34 occupy a central position and the conductors 27, 25 are on the side of the wall 46.

The conductor 37 is connected to the condenser 38 which is near it, while the conductor 15, along the wall 44 is connected to the point $16_1$ which is near said wall. The conductors $19_1$, $19_2$, $19_3$ hug the wall 45 between that wall and the resistances 16 and 21 which, with the conductor $19_4$, hug the wall 43 between this wall and the condenser 38.

The two terminals of the circuit-breaker 20 are connected directly at the point $16_4$ and $16_3$ by conductors 20a and 20b which are close together and which hug the wall 46 and the wall 43 between the latter and the central assemblage formed by the relay 24 and the condenser 38.

The conductor 39 passes between the condenser 38 and the relay 24, and is connected to the terminal 38a of the condenser disposed between the latter and the resistances 16 and 21. The conductor 34 is connected to the terminal 35, disposed opposite the relay 24.

The conductor 27 is connected at one end disposed opposite the winding of the relay 24 and the conductor 25 is connected at the other end of this winding.

The conductor 22 connected to the terminal 23 of the relay 24 passes on the side of the conductor 39 between the condenser 38 and the relay 24, passing between the wires 19, 20a, 20b and the condenser 38, is connected to the resistance 21.

As an alternative (Fig. 7), the arrangement is similar to that which has been described with reference to Fig. 1, except that additional means are provided for compensating for the objectionable effect of a too sudden and too pronounced action on the accelerator, particularly for a start in second speed.

Under such an action, the resistance introduced in the circuit tends to rapidly decrease, more so when the circuit-breaker 20 is open, while the dynamo, connected to the speed of the motor, generates a strong current. The clutch is or immediately becomes engaged with great force and without gradual action.

In most cases, except if the vehicle descends a slope, the motor, made practically solid with the driven shaft, cannot copy with the sudden relative augmentation of the resisting couple or breaking torque which follows immediately the pedal stroke of the accelerator without perceptibly slowing down.

The current generated by the dynamo can then become sufficiently low to cause the disengagement of the clutch. The motor races again producing notable jerks.

According to the means provided in the alternative arrangement of Fig. 7 which eliminates this drawback, a resistance 80 is introduced in the circuit, for example in the conductor 15. The resistance 80 is shunted by a cut-out 81. The latter is controlled by a rod 82 connected to a diaphragm or membrane 83 closing a chamber 84. The chamber 84 is connected by a pipe 85 to the pipe connecting the carburetor to the motor, at a point of this pipe distant from the motor. At such a point, the depression is a function of the motor couple and is practically independent of the speed.

In normal conditions of working, that is to say in the absence of too sudden actions on the accelerator, the depression in the chamber 84 is sufficient for attracting the membrane 83 and closing the cut-out 81, so that the resistance 80 is not a part of the circuit. When the accelerator is suddenly actuated, the depression in the chamber 84 decreases, which eases the membrane 83 and opens the cut-out 81. The resistance 80 then is introduced in the circuit. The clutching, instead of being immediate and total, becomes gradual, so that the driving shaft and the driven shaft of the clutch can gradually adapt themselves to a same speed without untimely lowering of the regime of the motor. The depression then resumes its normal value, the membrane 83 is again attracted, the resistance 80 is put out of circuit. Any jerk in the transmission is thus avoided.

In the alternative of Fig. 8, the arrangement is similar to that of Fig. 7, with resistance 80, rod 82, membrane 83, chamber 84, pipe 85, except that the resistance 80 is associated not only with the membrane 83 but also with another control member 86. The latter is connected by a rod 87 to a cut-out 88 shunting the resistance 80 and connected, in the example shown, in parallel with the cut-out 81.

The control member 86 may consist of a governor connected to the motor shaft so as to close the contact 88 above a suitable operation of the motor, or in a chronometric mechanism such as a wheel train closing the contact 88 when a predetermined time has elapsed after the opening of the cut-out 81.

In another alternative (Fig. 9), the arrangement is similar to that which has been described with reference to Fig. 1, except that the resistance 16 with rheostat 17 is modified. In the alternative of Fig. 9, the conductor 15 is connected at 89 to two conductors 90 and 91 in parallel. The conductor 90 is connected to the resistance 92 of a rheostat the fixed studs of which are seen at 93 and the movable contact at 94. The conductor 91 is connected to the resistance 95 of a rheostat the fixed studs of which are seen at 96 and the movable contact at 97.

The two studs 94 and 97 are mounted on a support 98, adapted to move opposite the rheostats 93 and 96 along a guide 99. The studs 94 and 97 are respectively connected to the two terminals 100 and 101 of a reverser 102 the movable finger of which, 103, is connected to the resistance 21.

The movable support 98 is controlled, with regard to its displacement, by the accelerator so that one or the other of the two studs 94, 97 introduces in the circuit a resistance which is the weaker, when the opening of the throttle is greater. The reverser 102 is connected to the gear-box so that for the reverse and the first speed, the current passes for example by the stud 94 and the conductor 90, while for the other speeds the current passes by the stud 97 and the conductor 91. The resistance 92 is then selected higher than the resistance 95, the position of the studs 93 and 96 being suitably selected with respect to their respective resistances. In this way the suitable degree of gradual action of the clutch is obtained in each particular case, that is to say pronounced gradual action when the vehicle advances slowly and reduced gradual action when the vehicle runs at full speed.

As in embodiment described with reference to the Fig. 1, the resistance 92 introduced in first or reverse speed with the accelerator inoperative, is selected so that the couple that can be transmitted by the clutch does not exceed one quarter of the maximum couple of the motor, while the resistance 95, introduced in second speed, third speed and higher, with the accelerator inoperative, is selected so that the couple that can be transmitted by the clutch is comprised between one half of the maximum couple of the motor and the couple corresponding to the slipping of the driving wheels.

Figure 10:
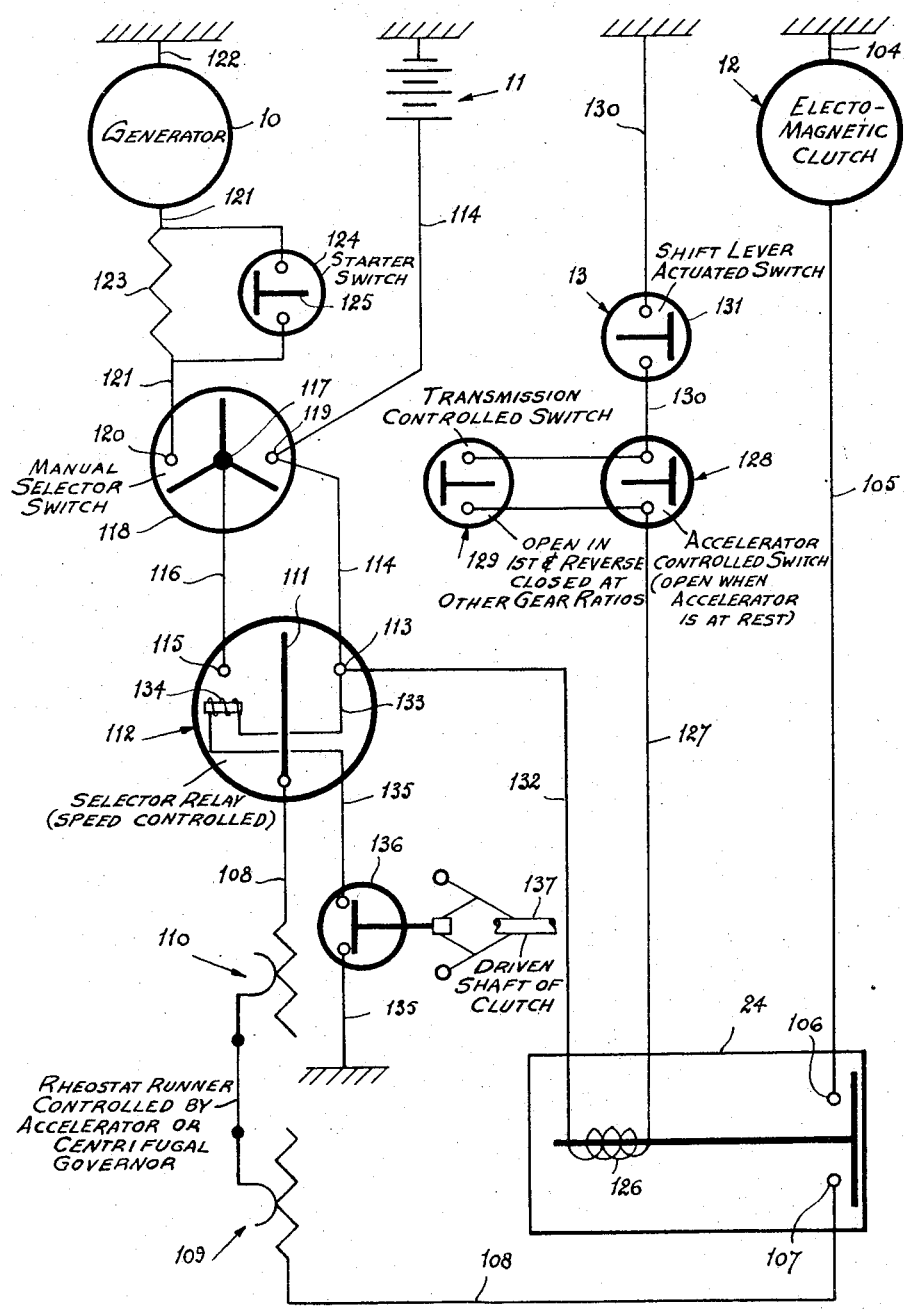
Fig. 10 is a diagram of an alternative control circuit.

Referring now to Fig. 10 where a diagram of a circuit is represented somewhat similar to that of Fig. 1 but with modifications of detail: It will be seen that 10 represents, the dynamo, 11, the battery, 12, the clutch winding, 13, the speed bent-lever and 24 the relay for the closing of the supply to the winding 12. The winding 12, which is grounded at 104, is connected at its other end by a conductor 105 to a terminal 106 of this relay. The other terminal 107 of the relay 24 is connected to a conductor 108 which comprises a rheostat 109 similar to the rheostat 17 of Fig. 1 and actuated by the pedal of the accelerator, so that the resistance of the rheostat 109 decreases when the opening of the throttle increases. As will be understood by those skilled in the art, the rheostat 109 could also be controlled by a centrifugal governor 109a (Fig. 12) controlled by the speed of rotation of the motor. The conductor 108 comprises an adjusting resistance 110, similar to the resistance 21 and intended to adjust at will the tightening effort on the frictional linings of the clutch, in order to allow for the wear of these linings.

The conductor 108 is connected to the contact lever 111 of a reversing or selector relay 112 a stud of which, 113, is connected by a conductor 114 to the battery 11 of the vehicle, while the other stud 115 is connected by a conductor 116 to the contact 117 of a manual reverser or selector switch 118. One of the studs of the reverser 118, shown at 119, is located on the conductor 114, while the other stud 120 is connected by a conductor 121 to the dynamo 10 grounded at 122. The conductor 121 comprises a resistance 123 shunted by a cut-out 124. The latter is controlled by the pull-button of the starter, 125, for introducing the resistance 123 when said button is actuated in the circuit.

The principal closing relay 24 is controlled by a winding 126 so as to be closed or open according as to whether or not winding 126 is energized.

One extremity of the winding is connected to a conductor 127 comprising two cut-outs 128 and 129 connected in parallel. The cut-out 128 is controlled by the accelerator so as to be open when the pedal is lifted, and closed as soon as one presses on the pedal, while the cut-out 129 is controlled by the gear-box so as to be open in first speed and in reverse and closed for the other speeds. A conductor 130 connects the cut-outs 128, 129 in parallel to earth and comprises a cut-out 131 controlled by any suitable means by the speed lever 13 so as to be open or closed according as this lever is acted upon or not.

The other end of the winding 126 is connected by a conductor 132 to the stud 113 of the reversing relay 112. This stud 113 is besides connected by a conductor 133 to one end of the winding 134 controlling the contact lever 111, the other end of the winding 134 being connected to earth by a conductor 135. The latter comprises a centrifugal cut-out 136 so disposed as to be closed or open according as the driven shaft 137 of the clutch turns below or above a predetermined small speed. It will be seen that, in the first case, the finger 117 being normally applied against the stud 120, the lever 111 is applied against the stud 115 and it is the dynamo 10 which supplies the winding 12 of the clutch, while in the second case, it is the battery.

At the moment of starting, the vehicle being stopped, there is in this way a supply by the dynamo only. As the motor is running slowly, the dynamo generates little or no current. Moreover, the rheostat 109 constitutes an important resistance in the circuit. There is therefore an automatic disengagement of the clutch when stopped, before starting.

For starting, the accelerator is pressed down, the motor rotates faster, the dynamo generates more and more current. At the same time the rheostat 109 opposes a lesser resistance. It will be understood that the regulation of the energizing current of the winding, provided by the dynamo, is double, this regulation being under control of the motor regime through the dynamo itself and to the motor couple by means of the rheostat 109. In these conditions, the energizing current of the winding 12 grows gradually and the clutching effort increases gradually in the clutch. In this way, a very smooth starting is obtained which can be made to last at will or on the contrary be made smart without risk of jamming the motor.

The resistance 109 which intervenes in totality when one happens to be in second speed, third speed or higher and the accelerator is inoperative, is selected in the same manner as in the former embodiments, so that the couple which can be transmitted by the clutch is comprised between one half of the maximum couple of the motor and the couple corresponding to the slipping of the driving wheels.

It is sometimes necessary or desirable to start the stopped motor by driving it by means of the vehicle. It is then sufficient to engage one speed and to bring the vehicle up to the point when it exceeds the speed, from which point the cut-out 136 ensures the energizing of the winding 12, no longer by the dynamo but by the battery, which engages the clutch. Evidently, matters are arranged so that the principal relay 24 is closed. Down a slope, one proceeds in second or in third, which causes the engagement by the battery as soon as the vehicle exceeds the desired speed. In this case, the cut-out 129 is closed, which closes the relay 24, to which one needs not give any attention.

When, for any reason, the dynamo fails, one can actuate the clutch by means of the hand-reverser or manual selector switch 118 which energizes the winding 12 by means of the battery 11. This reverser 118 also enables the engagement to be maintained, when stopped, on a slope with a speed in gear, in case of failure of the hand-brake.

When the motor is cold, the starter is used, the effect of which is to raise the slow running speed of the motor. Owing to the resistance 123 and to the cut-out 124, the fact that the starter is actuated introduces a resistance in the energizing circuit of the winding 24 and, in this way, the conditions of starting with starter are brought to what they are without starter.

As has been seen, the passage of one speed to another or of the dead-centre to a speed, or of one speed to the dead-centre automatically causes the opening of the cut-out 131, which ensures the disengagement of the clutch.

In passing through the speeds, the driver may inadvertently linger at the dead-centre while the motor runs slowly. As the vehicle runs normally at the speed which corresponds to the energizing by the battery, the clutching will be obtained automatically as soon as the new speed is selected. If the motor jaws this clutching will ensure restarting of the motor by being driven. All risk is in this way avoided.

During maneouvers or when driving in town, when the gearbox of the vehicle is in first speed or in reverse, one has to slow down, brake, start again, etc. at small speed. For the first speed or the reverse, the cut-out 129 is open as it has been seen and when, for slowing down, one lifts one's foot from the accelerator, the cut-out 128 opens. The relay 24 opens and the clutch disengages. Any brutal braking or speeding-up of the vehicle is in this way avoided.

It is seen that the arrangement according to the diagram of Fig. 10 comprises supplementary elements with respect to the diagram of the Fig. 1, such as the reverser relay 112 controlled directly by the value of the speed of the driven shaft so as to obtain automatically the supply of the winding of the clutch either by the battery or by the dynamo, without the intervention of the driver of the vehicle. It goes without saying that a reversing relay 112 may be included in the diagram of Fig. 1, particularly on the conductor 15. Similarly, the two cut-outs 128, 129 which are provided in the diagram of Fig. 10 and not in that of Fig. 1, may be included in the diagram of Fig. 1 to replace or complete the whole of the section $16_3$—$16_4$ and circuit-breaker 20.

One will notice finally that in the diagram of Fig. 10, the supply by the battery is used in normal running under the same conditions as the supply by the dynamo, the passage from one supply to the other being controlled by the cut-out 136 according to the speed of the driven shaft, the regulation members such as the resistances 109, 110 and the cut-outs 128, 129, 131 coming in action in both cases, while in the diagram of Fig. 1 in which the supply by the battery only is exceptional and takes place only in case the dynamo fails, the connection is direct between the clutch winding and the battery, which allows the restoration of conditions to normal not only in case of bad working of the dynamo, but also in case of failure of the delicate members such as the lever 13, the rheostats and others. Of course, in the diagram of Fig. 1 as in that of Fig. 10, the parallel connection of the dynamo and of the battery takes place in a normal manner by the operation of the circuit-breaker.

The diagram of Fig. 10 may evidently be completed by the arrangements of Fig. 7 or 8.

Alternatively (Fig. 11) the arrangement is similar to that described with reference to the Fig. 10, except that the principal relay 24 is modified and arranged so as to be closed when the winding is not energized and opened when its winding is energized. This winding is connected by the conductor 127 (Fig. 11) to cut-outs 138 and 139 similar to the cut-outs 128 and 129, but this time connected in series with inverted contacts. The cut-outs 138 and 139 are directly connected to earth. A cut-out 140 similar to the cut-out 131 but with inverted contacts is connected on the one hand to earth, on the other hand to the conductor 127 in parallel with the cut-outs 138 and 139. The embodiment of Fig. 11 has the particular advantage of reducing the fatigue of the relay 24 as well as the current consumption. The arrangement of Fig. 11 may be introduced in the diagram of Fig. 1.

Other forms of electric diagrams may evidently be provided in the scope of the present invention, which is not, as is well understood, limited to the embodiments described and shown but comprises all alternatives in the carrying out of its various elements. The invention is more particularly applicable to automobile vehicles propelled by internal combustion motors or explosion motors (petrol, diesel, semi-diesel, etc.) but it goes without saying that it can have in all or a part of its elements a great number of other applications, for example to machines, locomotives, etc.

What I claim is:

1. In a power transmission system having an engine, a throttle control for controlling the speed of said engine, a generator responsive to the speed of the engine, an electromagnetic clutch adapted to transmit increased torque with increased energization, a change-gear transmission driven by the engine, a gear shift lever for shifting gears in said transmission, a clutch control circuit comprising connection means between said generator and said clutch including means selectively and operatively controlled by said gear shift lever to electrically connect and disconnect said generator and said clutch thereby to de-energize and disengage said clutch, when shifting gears, variable resistance means operatively controlled by said throttle control and electrically connected between said generator and said clutch, the resistance in said variable resistance means having a maximum definite value when said throttle control is released, whereby the resistance in said variable resistance means is a function of the position of said throttle control and when said transmission is in gear said generator progressively energizes the clutch as its output increases and the resistance between said generator and the clutch decreases from said maximum definite value as said throttle control is actuated to increase the speed of the engine.

2. In a power transmission system having an engine acting as a prime mover, a throttle control for controlling the speed of said engine, a generator responsive to the speed of the engine, an electromagnetic clutch adapted to transmit increased torque with increased energization and having an actuating coil and a driven shaft, a change-gear transmission driven by the engine and adapted to effect change speed gear ratios, a gear shift lever for shifting gears in said transmission, a clutch control circuit comprising connection means between said generator and said clutch including means selectively and operatively controlled by said gear shift lever to electrically connect and disconnect said generator and said clutch thereby to de-energize and disengage said clutch when shifting gears, variable resistance means operatively controlled by said throttle control and electrically connected between said generator and said clutch and the resistance in said variable resistance means is a function of the position of said throttle control, said variable resistance and the throttle control being arranged so that the resistance in said variable resistance means has a maximum definite value when said throttle control is at rest and decreases as said throttle control is actuated to increase the speed of the engine, whereby said clutch is energized by said generator and remains disengaged when the engine is started and idling and is progressively engaged when said transmission is in gear and said throttle control is actuated to increase the speed of the engine.

3. In a power transmission in accordance with claim 2, in which the throttle control includes means for varying resistance in said variable resistance means at different rates thereby to decrease it rapidly when said throttle control is initially actuated and decrease it at a lesser rate as said throttle control is actuated to progressively increase the speed of the engine.

4. In a power transmission system in accordance with claim 3, in which the resistance in said variable resistance means is rapidly decreased to less than half of its total resistance value and at least one-third of said total resistance value when said throttle control is initially actuated and moves less than one-third of its total travel.

5. In a power transmission system in accordance with claim 2, in which said variable resistance means comprises a rheostat having fixed contacts and a movable contact operatively controlled by the throttle control, said movable contact successively engaging said fixed contacts, and said fixed contacts being arranged so that the resistance varies continuously and non-linearly as said throttle control is actuated.

6. In a power transmission system in accordance with claim 2, in which said variable resistance means permits said clutch to be only partially engaged when said transmission is shifted to a gear ratio higher than the first gear ratio and the throttle control is at rest with the engine idling, and when said throttle control is actuated to a maximum throttle opening the engine deliver substantially one half of its total torque.

7. In a power transmission system in accordance with claim 2, in which said variable resistance means includes bypass means operatively connected to said change-gear transmission for selectively by-passing a portion of the resistance, when the transmission is in gear ratios other than first and reverse, whereby the resistance is selectively decreased at higher gear ratios and increased at the first and reverse gear ratios.

8. In a power transmission system in accordance with claim 2, in which said variable resistance means comprises two resistances in parallel one of which has a higher resistance value than the other.

9. In a power transmission system in accordance with claim 2, in which said connection means between said generator and the clutch includes an adjustable resistance adjustable to maintain initial torque characteristics of said clutch regardless of its wear.

10. In a power transmission system in accordance with claim 2, further including a battery, connection means between said battery, the generator and the actuating coil of said clutch comprising a manual selector switch to selectively electrically connect said generator or said battery to the clutch, whereby said generator or said battery energizes said clutch selectively.

11. In a power transmission system in accordance with claim 10, in which said connection means further include automatic selector means responsive to the speed of the driven shaft of the clutch to selectively energize said clutch from the battery or the generator as a function of the speed of said driven shaft, whereby the battery energizes the clutch during predetermined speeds and the generator energizes the clutch at other predetermined speeds.

12. In a power transmission system in accordance with claim 11, in which said automatic selector means comprises a relay having an actuating winding energized by the battery and a cut-out switch responsive to the speed of the driven shaft connected to said winding and to said manually operated selector switch, and said manual switch being connected to energize said clutch from the battery if selectively actuated and regardless of the speed of said driving shaft.

13. In a power transmission system in accordance with claim 2, further including a battery and in which said means selectively and operatively controlled by said gear shift lever to electrically connect and disconnect said generator and said clutch includes a master relay having an actuating winding connected to said battery, and a switch actuated by said gear shift lever.

14. In a power transmission system in accordance with claim 13, in which said relay winding is connected to means operatively controlled by said throttle control and said transmission, said means comprising a first switch operatively controlled by said throttle control, said first switch being open when said throttle control is at rest and closed when said throttle control is actuated, a second switch in parallel with said first switch, said second switch being operatively controlled by said transmission and open in first and reverse gear ratios, both of said switches being connected between said relay winding and said switch actuated by said gear shift lever, whereby said relay is selectively energized and de-energized.

15. In a power transmission system having an engine, a throttle control for controlling the speed of the said engine, a storage battery, a generator responsive to the speed of the engine, an electrically energized and actuated clutch adapted to transmit increased torque with increased energization, a change-gear transmission driven by the engine and adapted to effect change speed gear ratios, a gear shift lever to shift gears in said transmission, a clutch control circuit comprising, in combination, connection means betwen said generator and said clutch including means selectively and operatively controlled by said gear shift lever to electrically connect and disconnect said generator and said clutch thereby to de-energize and disengage said clutch when shifting gears, variable resistance means operatively responsive to the speed of the engine and electrically connected between said generator and said clutch, whereby the resistance in said variable resistance means is a function of the speed of the engine and when said transmission is in gear said generator progressively energizes the clutch as its output increases and the resistance between said generator and the clutch decreases as said throttle control is actuated to increase the speed of the engine, a second resistance connected between the generator and the clutch, by-pass means connected to by-pass said second resistance selectively, said by-pass means including a cut-out switch and means operatively controlled connected to said switch to open and close said by-pass means, said means connected to the switch and operatively controlled by the engine being adapted for sensing rapid operating changes varying the speed of the engine, whereby rapid actuation of the throttle control increases the speed of the engine and the output of the generator and said shunt means are opened so that the second resistance assures gradual engagement of the clutch regardless of the rapid increase of the speed of the engine.

16. In a power transmission system in accordance with claim 15, in which the engine has an intake manifold and said means connected to said switch to open and close said by-pass means includes a chamber having a pressure-responsive diaphragm, means defining communication means between the chamber and said intake manifold, connection means between said diaphragm and said cut-out switch, whereby said diaphragm reacts to a rapid increase in manifold pressure and said cut-out switch is opened and gradual manifold pressure changes permit the switch to remain closed.

17. In a power transmission system in accordance with claim 15, in which said means connected to said switch to open and close said by-pass means further includes a chronometric gear system connected between the throttle control and said switch to open and close said by-pass means.

References Cited in the file of this patent
UNITED STATES PATENTS

| | | |
|---|---|---|
| 1,946,200 | Easter | Feb. 6, 1934 |
| 2,175,219 | Sanford | Oct. 10, 1939 |
| 2,539,649 | Winther | Jan. 30, 1951 |
| 2,613,773 | Gilfillan | Oct. 14, 1952 |